United States Patent [19]

Chireau et al.

[11] 4,118,552
[45] Oct. 3, 1978

[54] SELF-SUPPORTING ELECTRODE AND METHOD OF MAKING SAME

[75] Inventors: Roland F. Chireau, Quaker Hill, Conn.; Aldo S. Berchielli, Westerly, R.I.

[73] Assignee: Yardney Electric Corporation, Pawcatuck, Conn.

[21] Appl. No.: 867,056

[22] Filed: Jan. 5, 1978

[51] Int. Cl.$^2$ .................. H01M 4/04; H01M 4/58
[52] U.S. Cl. .................... 429/219; 204/286; 204/195 M; 204/291; 429/220; 429/232
[58] Field of Search ............. 204/195 M, 291, 286; 429/220, 219

[56] References Cited

U.S. PATENT DOCUMENTS

| | | | |
|---|---|---|---|
| 2,636,060 | 4/1953 | Fischbach et al. | 429/220 X |
| 3,445,290 | 5/1969 | Elliott et al. | 429/220 X |
| 3,591,464 | 7/1971 | Frant et al. | 204/1 T |
| 3,824,170 | 7/1974 | Weelink et al. | 204/195 M |
| 3,959,012 | 5/1976 | Liang et al. | 429/220 X |

FOREIGN PATENT DOCUMENTS

| | | | |
|---|---|---|---|
| 7,326,502 | 8/1973 | Japan | 429/219 |
| 7,409,339 | 3/1974 | Japan | 429/219 |

*Primary Examiner*—F.C. Edmundson
*Attorney, Agent, or Firm*—Donald E. Nist

[57] ABSTRACT

The improved self-supporting electrode of the present invention comprises a uniform mixture of cuprous chloride, preferably in major proportion and silver chloride, preferably in minor proportion. The electrode may also include a minor proportion of copper metal uniformly dispersed therein. The electrode is primarily used as a cathode, particularly in cells employing sea water as the electrolyte. The cathode preferably is formed by mixing the ingredients together and melting at least the cuprous chloride and silver chloride of the mixture and then casting the mixture and solidifying it so as to cause it to adhere to a current collector such as expanded copper metal. The current collector preferably is at or near the surface of the electrode and helps to support the electrode. The electrode is less expensive than one fabricated solely of silver chloride and yet is more resistant to degradation by humidity and has better electrical properties than conventional cuprous chloride electrodes.

15 Claims, No Drawings

SELF-SUPPORTING ELECTRODE AND METHOD OF MAKING SAME

BACKGROUND OF THE INVENTION

1. Field of the Invention

The present invention generally relates to electrochemical cells and more particularly to cuprous chloride-containing cathodes for electrochemical cells.

2. Prior Art

Silver chloride cathodes have a variety of uses, mainly in electrochemical cells employing a sea water as the electrolyte and a dissimilar anode, such as a magnesium anode. Silver chloride cathodes are relatively easily fabricated because silver chloride can be easily rolled, cast or extruded through a die while hot to form a self-supporting, integral structure. However, silver chloride is very expensive and, accordingly, attempts have been made to substitute less expensive materials for the same in fabricating suitable cathodes for such purposes.

It would also be desirable to provide an electrode capable of producing more power from the same volume or weight of material than is possible with a silver chloride electrode. Copper chloride has been substituted for silver chloride as the cathode material in a number of electrochemical cells such as those which have been used in certain buoys and radiosondes. Cuprous chloride, when used as a cathode in association with a magnesium anode and sea water as the electrolyte, normally produces 1.3–1.4 volts at a current density of about 200 ma/in$^2$. When silver chloride is used in place of the cuprous chloride in such as cell, it normally produces 1.5 volts and has a flat discharge curve for most of the discharge.

Theoretically, cuprous chloride should deliver 50% more coulombs than the same weight of silver chloride but this, in practice, does not occur because of the direction reaction of water in the electrolyte with cuprous chloride. Moreover, certain portions of the cuprous chloride electrode may suffer passivation during manufacture of that electrode. Cuprous chloride, in contrast to silver chloride, deteriorates rapidly in the presence of humidity. Therefore, complete sealing of cuprous chloride cathodes has had to be resorted to, particularly where any length of storage of the cathode before use has been involved. Although cuprous chloride is about 1/10th the price of silver chloride, the extra work and precautions involved in processing and protecting cuprous chloride make it disadvantageous economywise for certain smaller battery sizes.

Cuprous chloride is normally obtained as white powder in its freshly prepared pure state but turns green and may cake if exposed to the atmosphere. Although cuprous chloride is essentially insoluble in water (solubility of about 60 parts per million in cold water), cupric chloride, one of the reaction products of cuprous chloride with the atmosphere, is very soluble in water. Soluble cupric chloride in an electrochemical cell will result in precipitation of copper on negative electrodes with unfortunate results.

One method of manufacturing cuprous chloride electrodes involves pressing the cuprous chloride powder onto a copper mesh screen to form a plate and wrapping the resultant plate with porous paper. The paper may be pressed or cemented on the surface of the plate. However, this electrode is inferior in voltage comeup time on activation and deteriorates rapidly when exposed to humidity.

Another method of producing a cuprous chloride electrode involves forming a paste of cuprous chloride particles, water or other solvents, and a binder such as carboxymethyl cellulose or vinyl chloride, and then shaping the paste into desired form and drying it at about 100° C. The resulting electrode is usually in the form of a plate which is less prone to deteriorate on storage but has even poorer voltage come-up time on activation than does the pressed powder plate previously described.

Accordingly, there is still a need for a suitable substitute for silver chloride in electrodes, particularly cathodes for use in sea water cells. Such material should be resistant to deterioration during storage and should exhibit superior electrical properties in use. It also should be of inexpensive materials and be inexpensive to fabricate into the desired form.

SUMMARY OF THE INVENTION

All of the foregoing needs have been satisfied by the improved self-supporting electrode of the present invention. The electrode is substantially as set forth in the Abstract above. Thus, the electrode is primarily used as a cathode in sea water cells and comprises a mixture of cuprous chloride and silver chloride, preferably with copper metal dispersed therein. The mixture is melted, cast and then solidified, preferably so as to adhere to a current collector in the form of an expanded copper metal sheet or frame. Normally, the cuprous chloride is present in a major proportion and the remaining constituents of the mixture, namely, silver chloride and the copper metal (if the latter is present) in minor proportion. The silver chloride can be in a concentration of, for example, about 1–5 weight percent of the mixture and acts as a doping agent to improve the electrical performance of the cathode. The copper metal, if present, is in particulate form, for example, in a concentration of about 1–10 weight percent of the mixture, while the remainder of the mixture preferably consists of the cuprous chloride.

The electrode formed in accordance with the present method is a structurally strong depolarizing cathode having improved electrical properties. The cathode has minimum susceptibility to atmospheric humidity and has an excellent voltage come-up time, in contrast to conventional cuprous chloride cathodes. In addition, at a current density of 1.0 amp/in$^2$, the active material utilization of the cathode falls in the range of 5.5–6.0 grams of material per ampere hour. In contrast, conventional cuprous chloride electrodes made by the previously described pressing and pasting techniques operate at an active material utilization of about 10.5 grams per ampere hour.

In carrying out the present method, the preferred melting temperature is about 445° C. to about 475° C. This is sufficient to melt both the cuprous chloride and the silver chloride but insufficient to melt the copper metal, which is present in the mixture is dispersed particulate form. However, any temperature below the boiling point, about 1365° C., of the elements forming the binary chloride mixture can be used. It is preferred that the molten mixture be cast in a mold containing the metal collector, preferably with the collector lining the mold so that a portion thereof is exposed on the exterior of the electrode.

The described electrode has been successfully used as a positive electrode in sea water cells employing magnesium anodes. The cathode of the present invention is inexpensive, durable and efficient. Further features of the present invention are set forth in the following description.

DETAILED DESCRIPTION

The improved electrode of the present invention is made by the method of the invention. In accordance with the method, a uniform mixture is first formed comprising particulate cuprous chloride, particulate silver chloride, with or without, but preferably with particulate copper metal. The cuprous chloride employed is normally a white power with a purity of, for example, about 98 percent or more. The silver chloride is also a white powder, preferably one which has been prepared in accordance with the process set forth in U.S. Pat. No. 3,829,539, although other silver chloride powders can be used. The silver chloride may have a purity as high as 99.9 percent or more. The cuprous chloride may have a density, for example, of 3.13 and a mesh size, for example, of 60 (U.S. standard mesh). The silver chloride may have a density of, for example, 5.56 and also be of the same mesh size as the cuprous chloride or any other suitable mesh size. The copper metal should be in powder form, for example, a commercial grade with a particle size of about 10 microns or the like.

The silver chloride can be used in any proportion with the cuprous chloride but normally is present in a minor proportion with the cuprous chloride in major proportion. More particularly, the silver chloride is usually present in a concentration of only about 1-5 percent (most preferably about 1 percent) by weight of the mixture and is mainly utilized as a doping agent. The copper metal preferably is present in concentration of about 1-10 percent, most preferably about 1-5 percent by weight in the mixture. Normally, the mixture consists essentially or solely of these three constituents. These constituents are mixed together until a uniform blend is obtained, whereupon the mixture is heated to a temperature which at least melts the cuprous chloride and the silver chloride but is below about 1365° C., as previously specified. The preferred temperature range is about 455° C.–475° C. The copper metal particles in the molten mixture at this temperature will still be present in unmelted form.

Further in accordance with the present method, this molten mixture is cast into the desired shape, for example, a plate. This is most easily accomplished by pouring the molten mixture into a mold, such as a nickel plated steel mold or the like. Preferably, the mold already contains a metal current collector. Such metal collector may be copper or other metal such as silver, but preferably comprises an expanded copper metal sheet, for example with a thickness of 80 mils nominal, a weight of about 70 grams per in.$^2$ and a mesh count of about 62±3 mesh per ft. (the mesh count being made parallel to the length of the sheet). Other forms of the current collector can be used. Preferably, the current collector is positioned in the mold by lining the mold with it, so that the current collector's edges appear on the surface of the finished cast electrode. In any event, the molten mixture is placed into intimate contact with the current collector in the mold and strongly adheres thereto, in accordance with the present method, as the mixture is cooled and solidified to produce the desired electrode. After cooling, this cast finished depolarizing cathode is removed from the mold and is ready for use in a sea water cell. Certain features of the invention are further exemplified in the following specific examples:

EXAMPLE I

A uniformly blended mixture having a total weight of 84 grams and consisting of 94 parts by weight of cuprous chloride, 1 part by weight of silver chloride and 5 parts by weight of copper metal powder, all in 60 U.S. standard mesh size or smaller, was formed and then heated to and maintained at a temperature of 465° C. for 3 minutes, whereupon it was poured into a nickel plated steel mold having a cavity measuring 4 13/16 inches × 2 23/64 inches. A copper grid having a size of 4 ¾ inches × 2 11/32 inches and weighing 4.5 grams had already been placed in the mold when the molten mass was poured thereinto. The mass was then allowed to cool and solidify and then removed from the mold after reaching room temperature in about thirty minutes. The finished electrode (electrode A) as removed from the mold had a thickness of about 0.08 inches and was used as the cathode in a sea water cell containing a magnesium anode. A polypropylene mesh separator was placed between the anode and cathode in the cell. Both the anode and the cathode before placing in the cell had their edges insulated with Mylar tape. (Mylar is registered trademark of E. I. duPont de Nemours & Co., Wilmington, Delaware for polyester film, principally polyethylene terephthalate). The electrolyte for the cell was sea water with a 3.6 percent salinity at a temperature of 30° C.

A second electrode (B) was fabricated in a manner identical to that described for electrode A except for the absence of silver chloride in the mixture and for an increase of 1 percent in the concentration of cuprous chloride in the mixture. These two electrodes, A and B, were then tested in sea water cells containing identical magnesium anodes. The results of the tests are set forth in Table I below:

Table I

PERFORMANCE OF CUPROUS CHLORIDE ELECTRODES "DOPED" WITH SILVER CHLORIDE

| | Current | | A<br>99% CuCl/1% AgCl | B<br>100% CuCl |
|---|---|---|---|---|
| | Current (Amps) | Density (Amps/in$^2$) | Cast electrode Voltage (volts) | Cast electrode Voltage (volts) |
| 10 sec. | 2.4 | | 0.64 | 0.45 |
| 20 " | 2.7 | | 0.74 | 0.53 |
| 30 " | 2.8 | | 0.94 | 0.59 |
| 45 " | 2.9 | | 0.98 | 0.62 |
| 1 min. | 3.55 | 1.0 | 1.035 | 0.64 |
| 1.25 | " | 1.0 | 1.05 | 0.65 |
| 1.5 | " | 1.0 | 1.05 | 0.67 |
| 2 ' | " | 1.0 | 1.045 | 0.67 |
| 4 ' | " | 1.0 | 1.035 | 0.66 |
| 5 ' | " | 1.0 | 1.03 | 0.67 |

Table I-continued

PERFORMANCE OF CUPROUS CHLORIDE ELECTRODES "DOPED" WITH SILVER CHLORIDE

|  | Current | | A | B |
|---|---|---|---|---|
|  |  |  | 99% CuCl/1% AgCl | 100% CuCl |
|  | Current (Amps) | Density (Amps/in$^2$) | Cast electrode Voltage (volts) | Cast electrode Voltage (volts) |
| 6' | " | 1.0 | 1.025 | 0.67 |
| 6.5' | 4.0 | 1.13 | 0.96 | 0.58 |
| 7.5' | " | 1.13 | 0.96 | 0.58 |
| 8.5' | " | 1.13 | 0.95 | 0.59 |
| 9 | 2.0 | 0.57 | 1.20 | 1.03 |
| 10 | 2.0 | 0.57 | 1.18 | 1.00 |
| 11 | " | 0.57 | 1.18 | 0.99 |
| 11.5 | 1.0 | 0.28 | 1.34 | 1.27 |
| 14' | 0.5 | 0.14 | 1.42 | 1.36 |
| 16' | 0.5 | 0.14 | 1.39 | 1.33 |

Table I clearly indicates the superiority of performance of the cuprous chloride cathode containing the doping concentration of silver chloride (A) in contrast to the silver chloride-free cuprous chloride cathode (B). Cathode (A) is also superior to other cuprous cathodes of the prior art. It is capable of operating at high current densities, for example, in excess of 1 amp. per in.$^2$ and of utilizing the active material in an efficient manner.

EXAMPLE II

Improved electrodes of the invention are prepared in accordance with the method of Example I but utilize the concentrations of constituents as set forth in Table II below:

Table II

| Electrode | Constituents | Concentrations (part by weight) |
|---|---|---|
| C | cuprous chloride | 98 |
|  | silver chloride | 2 |
| D | cuprous chloride | 85 |
|  | silver chloride | 5 |
|  | copper metal | 10 |
| E | cuprous chloride | 92 |
|  | silver chloride | 3 |
|  | copper metal | 5 |
| F | cuprous chloride | 95 |
|  | silver chloride | 5 |

The physical and electrical properties of electrodes C, D, E and F are substantially similar to those of electrode A, with electrodes D and E being somewhat improved over electrodes C and F.

The improved electrode of the present invention offers substantial improvements in cost, durability and performance over conventional cathodes utilizable for the same purposes. Other features of the invention are set forth in the foregoing. Various modifications and additions can be made in the improved electrode of the invention, its components and parameters, and in the present method, its steps and parameters. All such modifications and additions as are within the scope of the appended claims from part of the present invention.

What us claimed:

1. An improved self-supporting electrode, said electrode comprising a substantially uniform cast, solidified mixture of a major proportion by weight of cuprous chloride and a minor proportion by weight silver chloride.

2. The improved electrode of claim 1 wherein said electrode includes a minor proportion of copper metal.

3. The improved electrode of claim 2 wherein said silver chloride is present in said mixture in a concentration of about 1–5 percent by weight.

4. The improved electrode of claim 2 wherein said copper metal is present in said mixture in a concentration of about 1–10 percent by weight.

5. The improved electrode of claim 2 wherein said electrode is a cathode and wherein said mixture consists essentially of said cuprous chloride, silver chloride and copper metal.

6. The improved electrode of claim 2 wherein said electrode includes a current collector adherent to said mixture.

7. The improved electrode of claim 6 wherein said current collector comprises expanded copper metal.

8. The improved electrode of claim 6 wherein said mixture has been melted, cast and solidified in association with said collector so as to adhere strongly thereto and be supported thereby.

9. The improved electrode of claim 8 wherein at least a portion of said collector is exposed on the exterior of said electrode.

10. A method of making an improved supporting electrode, which method comprises:
 a. forming a mixture comprising a major proportion by weight of cuprous chloride and a minor proportion by weight of silver chloride;
 b. heating said mixture to a temperature at least sufficient to melt said cuprous chloride and silver chloride;
 c. casting the resultant molten mixture and solidifying the same to a self-supporting electrode.

11. The improved method of claim 10 wherein a minor proportion of copper metal is present in said mixture and wherein said temperature is insufficient to boil constituents of said mixture therefrom.

12. The method of claim 11 wherein said temperature is between about 455° C. and about 475° C. so that said copper is not melted in said molten mixture, said copper being present in said molten mixture in uniformly dispersed particulate form.

13. The method of claim 11 wherein said solidifying of said mixture is carried out in the presence of a current collector so that said mixture, when solidified, adheres thereto.

14. The method of claim 13 wherein said current collector comprises expanded copper metal and wherein said casting and solidification are effected such that at least a portion of said collector is exposed on the exterior of said electrode.

15. The method of claim 14 wherein said silver chloride is present in said mixture in a concentration of about 1–5 percent by weight and wherein said copper metal is present in said mixture in a concentration of about 1–10 percent by weight.

* * * * *